Nov. 3, 1925.
1,559,937
T. M. CHANCE
METHOD AND APPARATUS FOR SEPARATING MATERIALS
OF DIFFERENT SPECIFIC GRAVITIES
Filed Jan. 24, 1921    2 Sheets-Sheet 1
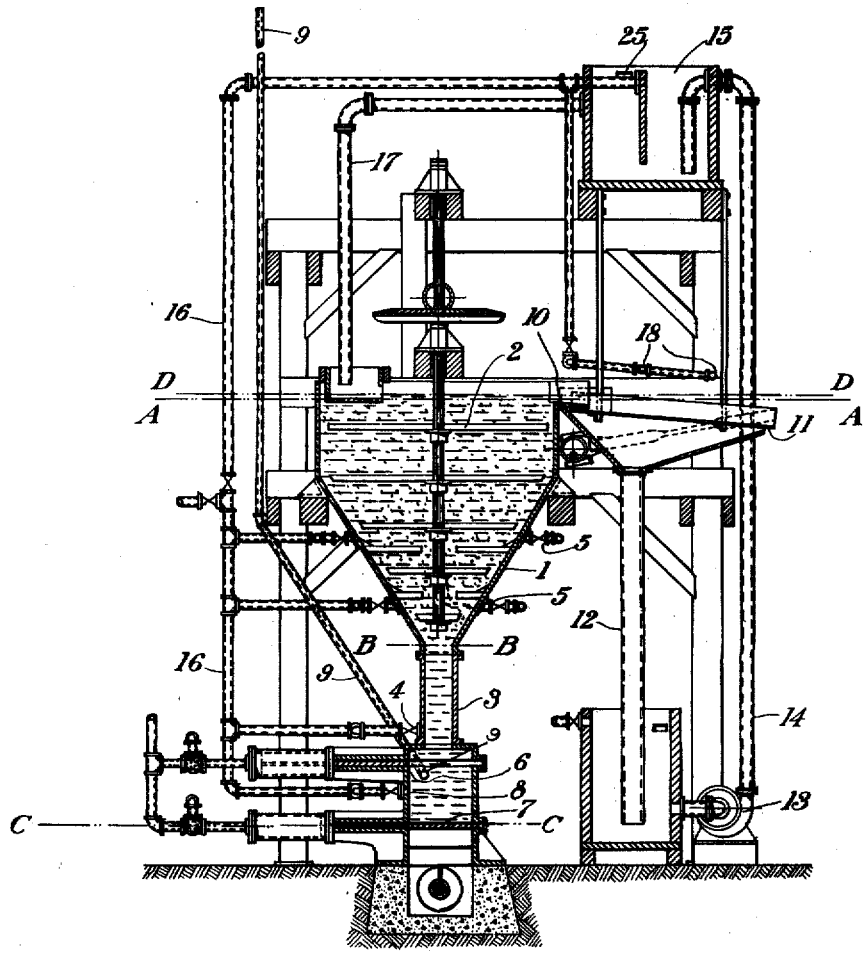
FIG. I
WITNESSES:
H. M. Chance
C. K. Schulze
INVENTOR.
Thomas M. Chance Nov. 3, 1925.
T. M. CHANCE
METHOD AND APPARATUS FOR SEPARATING MATERIALS
OF DIFFERENT SPECIFIC GRAVITIES
Filed Jan. 24, 1921
1,559,937
2 Sheets-Sheet 2
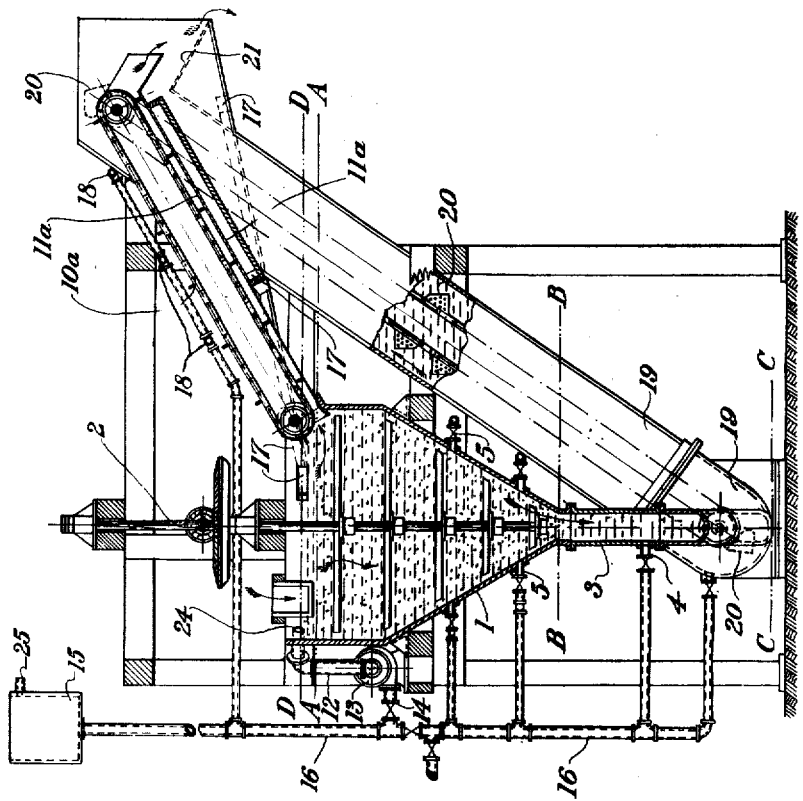
FIG. II
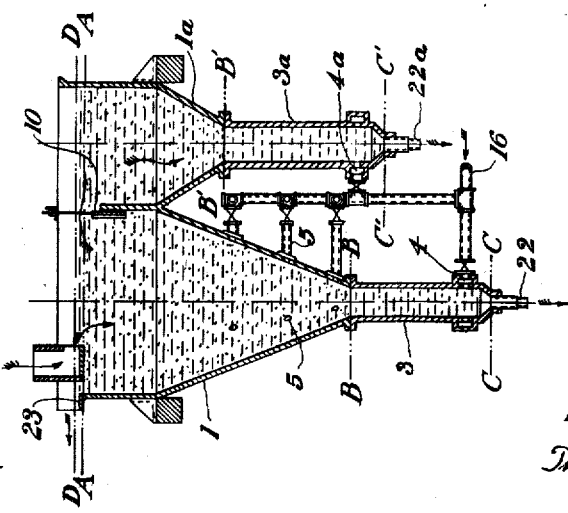
FIG. III Patented Nov. 3, 1925.

1,559,937

UNITED STATES PATENT OFFICE.

THOMAS M. CHANCE, OF PHILADELPHIA, PENNSYLVANIA.

METHOD AND APPARATUS FOR SEPARATING MATERIALS OF DIFFERENT SPECIFIC GRAVITIES.

Application filed January 24, 1921. Serial No. 439,498.

*To all whom it may concern:*

Be it known that I, THOMAS M. CHANCE, a citizen of the United States, residing at Philadelphia, in the State of Pennsylvania, have invented certain new and useful Improvements in Methods and Apparatus for Separating Materials of Different Specific Gravities, whereof the following is a specification.

The object of my invention is to provide a method and apparatus for the separation of solid materials of different specific gravities by means of a fluid body of relatively high specific gravity. Such a fluid body I will hereafter term a "fluid mass", said fluid mass being composed of an agitated mixture of comminuted solid material and liquid. A further object of my invention is to provide a method and apparatus for permitting the separated materials to be removed from said fluid mass with a minimum of the comminuted solid component of the said fluid mass admixed therewith.

To attain these ends I provide a fluid mass of relatively high specific gravity superimposed upon a fluid medium of lower specific gravity. This fluid medium may be composed of a fluid mass of low specific gravity or in some cases may consist entirely of the liquid component of said superimposed fluid mass.

A better conception of the method of operation which I employ may be had by reference to the accompanying drawings and the description of operation thereof as embodied in this specification. The drawing Fig. I represents a vertical cross-section of apparatus designed to employ my method in which the heavy component of the separated materials is withdrawn through a fluid medium of low gravity, which is used to assist in supporting the relatively higher gravity fluid mass employed for separating said materials. Materials of specific gravity lighter than the separating fluid mass are in this type of apparatus discharged by means of an overflow weir, the heavier separated materials being trapped out of the bottom of the apparatus. Fig. II represents a vertical cross-section of apparatus of similar nature, but employing a mechanical elevating means for removing the separated materials of low specific gravity from the fluid mass, the heavier separated materials being removed from the bottom of the apparatus by an elevator. Fig. III represents apparatus designed to employ my method in which the separated materials of both high and low specific gravity are removed through fluid mediums of low specific gravity which are used to assist in supporting fluid masses of higher specific gravity. It will of course be understood that the drawings are diagrammatic and represent the association of elements necessary to carrying out my invention. Like numbers in the several drawings represent like parts.

In the drawing Fig. I, 1 is a tank or receptacle adapted to contain a fluid mass of relatively high specific gravity consisting of an agitated mixture of comminuted solids and liquid, 2 is a mechanical agitator designed to assist in maintaining the fluidic properties of said fluid mass, 3 is an extension of tank 1 adapted to contain a fluid medium of relatively low specific gravity, 4 is a valved inlet for the introduction of liquid for agitation, 5, 5 are valved inlets for auxiliary liquid for such agitation, 6 and 7 are valves for the trapping out of the separated material of heavy specific gravity which has fallen through extension 3, these valves being of the type commonly employed with the Robinson type of coal washer and therefore known to any skilled in the art, 8 is a valved connection from 16 to the chamber between 6 and 7 to refill said chamber with water after it has been emptied of its contents by the opening of 7, 9 is an outlet to permit the free escape of air from the chamber between 6 and 7, 10 is an overflow designed to permit the upper portion of the fluid mass to be discharged from the apparatus, carrying with it the separated materials of light specific gravity, 11 indicates de-sanding means for removing particles of the comminuted solid and liquid forming the fluid mass from the material of light specific gravity, the means in this case being shown as a shaking screen of a type known to any skilled in the art, 12 is a collecting tank and conduit returning the portions of the fluid mass separated to tank 1, the means employed for such return comprising pump 13, conduit 14, settling tank 15, provided with overflow or outlet 25, clear water conduit 16 supplying water to the valved inlets 4, 5, etc., and a fluid mass conduit 17. A further adjunct of the apparatus consists in spray pipes 18, fed from clear water conduit 16, these spray pipes assisting in the de-sanding operation. It is evident that the lighter of the separated materials floated by said fluid mass may be removed from said tank, in part or in whole, by means for such removal such as are described and illustrated in patent issued to me May 1st, 1917, No. 1,224,138 for improvement in coal washing and ore concentration, without departing from the spirit of my invention.

If the chamber between valves 6 and 7 is not provided with the air vent 9 and liquid refilling valve 8, the air in said chamber, upon opening valve 6, will rise through 3 and through the fluid mass filling the receptacle 1, causing disturbances which may interfere with the proper functioning of the fluid mass as a separating medium when high densities are to be employed. Under these conditions the refuse valves will function in a manner duplicating that of the long used Robinson tub coal washer, the refuse chamber being emptied at each cycle and the air filling this chamber being discharged upwardly through the washer. Liquid admitted to this chamber through valve 8 filling the chamber and rising in the air vent 9 maintains a liquid seal to prevent air from finding its way into the fluid mass. The filling of the chamber with liquid also prevents liquid from flowing from the receptacle 1 down through 3 when valve 6 is opened, and also provides liquid which later is displaced by the falling of the heavier of the separated materials into the chamber, the liquid thus displaced rising upwardly through 3 increasing the upward current classifying action of the conduit 3. When valve 7 is opened the contents of the chamber between valves 6 and 7 are discharged from the apparatus, falling into any convenient pit or receptacle from which they may be removed by any suitable means diagrammatically illustrated in Fig. I as a screw conveyor, the chamber automatically filling with air as these materials are discharged from the apparatus, so that upon closing valve 7 the chamber is filled with air. In Fig. II a liquid seal to prevent the admission of air into 3 and into the receptacle 1 is maintained by the liquid filling elevator boot 19. It is of course evident that the apparatus of Fig. I will function without the refilling of the chamber by means of the valve 8 or other extraneous means, the air vent 9 permitting the air to escape from the chamber which upon the opening of valve 6 fills with liquid and solids discharging from 3 and 1, thus producing a downward flow of liquid and solids through 3 during the period of such discharge.

The drawing Fig. II comprises the same association of elements just described with reference to Fig. I, with the exception that overflow 10 in this case is replaced with elevating means such as a drag screen consisting of scraper line 10ª, operating on perforated plate 11ª said drag screen performing the de-sanding function, and that the discharge valves 6 and 7 are replaced by boot 19, and elevator 20, for removing the separated material of heavy specific gravity and discharging it at an elevation greater than the hydraulic head of the fluid mass contained in tank 1. A further appliance used in this embodiment of the invention consists in the de-sanding screen 21, returning, if desired, to tank 1 fine sand that may be discharged by said elevator 20. It will of course be understood that all or part of the buckets of elevator 20 may be perforated or solid and that the de-sanding drag screen 10ª—11ª may be replaced with a bucket elevator, or other elevating means, and that elevator 20 may be replaced with other elevating means such as a drag line, worm conveyor or other type of elevator, without departing from the spirit of my invention. The tank 1 is provided with an overflow or outlet 24 for discharging the liquid used in maintaining agitation in 1 and 3.

Fig. III illustrates apparatus of the same general type as that shown by Figs. I and II but with the further addition of a secondary fluid mass contained in tank 1ª, and of lower specific gravity than the fluid mass contained in tank 1. This secondary fluid mass is supported by a fluid medium of lower specific gravity than said secondary fluid mass, said fluid medium being contained in extension 3ª, and is provided with hydraulic agitating means 4ª and discharge 22ª for the removal of the separated materials. The discharge 22 from 3 and also the discharge 22ª from 3ª, for the discharge respectively of materials of higher specific gravity than that of the fluid masses or liquid in 3 and 3ª, are shown as discharges of the spigot type commonly employed in hydraulic classifiers and jigs, the liquid inlets 4 and 4ª providing sufficient water in excess of that required for agitation to maintain such spigot discharges, and an outlet or overflow 23 is provided to discharge liquid used for agitation from both tanks 1 and 1ª. This particular apparatus therefore serves to show an embodiment of the invention designed to handle relatively finer materials, adapted to be discharged through spigot discharges, but it will of course be understood that any of the types of elevators or conveyors or valves illustrated diagrammatically by Figs. I and II and as above described may be substituted for the spigots 22 and 22ª. In the drawing Fig. III, no mechanical agitating means such as those designated by the numeral 2 in Figs. I and II is shown. In those applications of the invention designed to employ fluid masses of relatively great dilution, and therefore low specific gravity, such for an example as may be employed for the separation of certain grades of bituminous coal, mechanical agitation may not be essential and I have therefore illustrated by Fig. III apparatus to show the simplest combination of elements that may be employed. It will of course be understood that if desired mechanical agitation such as is illustrated diagrammatically by agitator 2 of Figs. I and II may be employed in both tanks 1 and 1ᵃ of Fig. III and also that apparatus of the types shown by Figs. I and II may be designed to operate by hydraulic agitation alone.

In the several drawings the line A—A indicates the upper level of the fluid mass of relatively high specific gravity and B—B its lower level, the fluid medium of relatively lower specific gravity being included between this line B—B and the line C—C. The higher specific gravity fluid mass occupying the space between lines A—A and B—B in tank 1 of all the drawings and that of lower specific gravity between the lines A'—A' and B'—B' of tank 1ᵃ of Figure III are indicated conventionally by broken lines and stippling, the liquid or fluid medium between lines B—B and C—C and between lines B'—B' and C'—C' of Figure III are indicated by broken lines without stippling and the supernatant liquid between lines A—A and D—D is in all the drawings also indicated by broken lines.

In the operation of my invention there will generally be a supernatant body of the liquid constituent of the fluid mass resting upon said fluid mass. This body of liquid is of assistance in washing the comminuted solids from the separated materials of low density in the types of apparatus shown by both Figs. I and II. The maintenance of such a body of liquid above a fluid mass has been described and broadly claimed in my copending application, Serial No. 188,430, filed August 27, 1917, for method and apparatus for washing coal and concentrating ore and minerals, and I do not therefore claim it herein, except in combination with the subject matter of this application. The water level existing in the upper part of the separating tank, when such a body of liquid is maintained therein, is indicated by the line D—D in the several drawings.

While in many cases tanks of cylindroconical shape may be employed it will of course be understood that the method can be carried out in a receptacle of any shape permitting the formation of a fluid mass of necessary characteristics therein and adapted to discharge the separated materials of specific gravity greater than that of said fluid mass, and which therefore sink through said mass, into a fluid medium of specific gravity relatively lower than the specific gravity of the fluid mass employed for the purposes of separation, and in the case of apparatus designed to handle large tonnage, a number of such discharges may be employed with a single tank, thus utilizing a like number of columns containing the fluid medium of low specific gravity.

The operation of my method with reference to the drawing Fig. I may be described as follows. Materials to be separated being fed into the fluid mass contained in tank 1 are separated by reason of differences in their specific gravities, without relation to the size or shape of the various particles of which they consist. The materials of specific gravity greater than that of the fluid mass sink to the lower portion thereof and pass into the fluid medium in 3, which in this particular embodiment of the invention will preferably be composed almost or entirely of liquid, said liquid rising at a velocity less than the falling velocity therein of the smallest particle of said heavy separated material which is to be removed from the appartus. During this operation valve 6 is open permitting said heavy material to fall into the chamber between valves 6 and 7. During this operation hydraulic water may, if desired, be introduced through valved connection 8 for the removal of any particles comprising the solid constituent of said fluid mass which may have come down with said heavy material. When said space is approximately filled with said heavy material valve 6 is closed and valve 7 is opened discharging the separated material from the apparatus. Valve 7 is then closed and after the air which may thus be trapped into the space between valves 6 and 7 is displaced from said space through outlet 9 by liquid flowing in through 8, valve 6 may be opened and material again allowed to descend into the space between the valves. The materials having specific gravities less than that of said fluid mass are floated by said fluid mass and low over discharge weir 10 to the de-sanding screen 11, which assists in removing portions of the fluid mass admixed therewith and discharges said separated materials. The return of the constituents of the fluid mass removed by screen 11, through the medium of conduits 12, pump 13, conduit 14, settling tank 15, and conduits 16 and 17 will be sufficiently clear to any skilled in the art.

The operation of the apparatus illustrated in Fig. II is precisely similar to that described with reference to Fig. I, with the exception that a fluid medium of relatively low specific gravity, consisting of water and particles of comminuted solid, may occupy extension 3, because elevator 20 and de-sanding screen 21 serve for the reclamation of any particles of comminuted solid matter which may fall from the fluid mass contained in tank 1 into extension 3 to form said low gravity fluid medium in extension 3 and may thus descend with the separated materials of high specific gravity, and with the further exception that the heavier material falling through the extension 3 into the elevator boot 19 does not act to displace liquid upwardly through such fluid mass to be discharged through the over-flow, as is the case in the operation of the type of apparatus illustrated by Fig. I. In the operation of the device shown by Fig. I, the heavier material falling into the chamber between valves 6 and 7 displaces an equal volume of liquid upwardly through the connection 3 into the cone 1 to be discharged through the over-flow 10, and this is repeated at each cycle during the period in which heavier material is falling into said chamber, the liquid so displaced causing increasing hydraulic agitation over that supplied by liquid admitted through valve 4. The liquid so displaced from the said chamber is, as already described, renewed after the emptying of said chamber through valve 7 by additional liquid admitted through valve 8 to re-fill said chamber after valve 7 is closed, and before valve 6 is again re-opened to permit the descent into said chamber of heavier material falling through the connection 3. It is, therefore, evident that if the heavier material be sufficient in quantity, and be trapped out at sufficiently short intervals, that this pumping action of the liquid by the falling material, may be sufficient to supply all or practically all of the liquid required for upward hydraulic agitation of the fluid mass. It will of course be understood that if elevating means are provided with the apparatus shown in Fig. I such a fluid medium containing a considerable portion of comminuted solids can be employed in extension 3, but this would require the addition of de-sanding means such as the screen 21 of Fig. II. It will of course be understood that de-sanding screen 21 may be any desired type of movable or stationary screen. The operation of drag screen 10ª and 11ª will be understood by any skilled in the art.

The operation of the apparatus shown in Fig. III is precisely similar to that described with reference to Fig. I, with the exception that a continuous discharge of the separated materials of heavy specific gravity is permitted through spigot 22, and that the de-sanding screens 11 and 11ª of Figs. I and II are replaced by a second zone of lower specific gravity than that contained in tank 1, said zone being a fluid mass contained in tank 1ª. This secondary fluid mass is of specific gravity low enough to permit the particles which were floated in tank 1 to sink in and through it and to pass into extension 3ª containing a fluid medium of specific gravity lower than that of said secondary fluid mass, from whence they are discharged continuously through spigot 22ª. In this type of apparatus no extraneous de-sanding devices are essential because the fluid media contained in extensions 3 and 3ª prevent the discharge of any considerable quantity of the solid constituent of the fluid mass. For this purpose these fluid media would therefore preferably be composed entirely of liquid, although, as pointed out with reference to Fig. II, they may serve merely for partial de-sanding, in which case if proper external elevating and de-sanding means are provided for the reclamation of the fluid mass, these fluid media may be composed of agitated mixtures of very low specific gravity consisting of a mixture of comminuted solid material and liquid. Apparatus of the described type as shown by Fig. III may be used to effect a three part separation, for if a discharge of the type indicated by 10 and de-sanding screen 11, shown by Fig. I, be added to tank 1ª the secondary fluid mass in tank 1ª may be used for removing a middlings product, such as the bone present in coal, or the middlings common to ore dressing and this supplemental overflow utilized to discharge the lighest separated material from the apparatus. It will be understood that the spigots 22 and 22ª are nozzles such as are ordinarily used to control the volume of the discharge from classifiers, thickness, etc., the volume being regulated by the diameter, length, shape, etc. of the nozzles used and that these provide the means, when operating the apparatus for a two part separation for the removal of the heavier of the materials through spigot 22 and for the removal of the lighter product through spigot 22ª, and when operating to make a three part separation spigot 22 is the means for removal of the heavier product and spigot 22ª is the means for removal of the intermediate product, the lightest product being removed through the discharge of the type shown by 10 which has been added to tank 1ª. It will of course be obvious that other tanks similar to 1ª may be added to the two shown by Fig. III so that the apparatus may comprise 3, 4 or more such tanks or receptacles, each of which would contain a fluid mass of lower specific gravity than that of the fluid mass in the tank from which it received its materials to be separated, the fluid mass in each such tank being provided with a fluid medium occupying an extension to said tank similar to extension 3ª, said fluid medium in each case being of a specific gravity less than that of the fluid mass in the tank from which it receives its materials to be separated. Thus any desired plurality of fluid masses, each one of lower gravity than its predecessor, may be employed for multi-stage separation.

My present invention is especially applicable to the concentration of ores or the washing of coal. In ore concentration, the materials of heavy specific gravity which fall through the fluid medium of low density will generally be valuable mineral to be recovered, as for exampe in the dressing of lead or copper ores, while in coal washing the heavy material thus removed from the apparatus will generally comprise the refuse, slate, rock, fireclay, pyrite, etc., or high ash and bony coal which is of less value than the purer coal of lower density which is floated by the fluid mass. I do not, however, limit myself to these specific applications of the invention as it may be advantageously applied to the commercial separation of any materials, the particles of which are large enough to permit flotation by the fluid mass, and the specific gravity of one of which is greater than the specific gravity of the fluid mass.

The method employed in the operation of my invention is based upon the flotation properties of a fluid mass produced by the agitation of a comminuted solid and a liquid such as water. By this method specific gravities suitable for coal washing readily may be obtained when quartz or similar sand is employed as the comminuted solid; the required densities generally ranging form 1.3 to 1.7. When higher densities are necessary, as in ore dressing, sands composed wholly or partly of concentrate, metallic material, heavy slags, or the like, may be employed for the securing of such increased specific gravity of the fluid mass. It will therefore be understood that any mixture of a comminuted solid and a liquid, such as water, which by agaitation may be caused to assume and maintain the fluidic properties necessary to the operation of my invention may be employed, if the size of said comminuted solids is sufficiently small to permit flotational action upon the smaller particles of the materials necessary to be separated. This limitation as to the relative sizes of the particles of solid matter composing the fluid mass and of the particles of material to be separated by flotation in said fluid mass and the limitation as to size of particles to be floated, means that if the particles of said lighter material are not substantially larger than the particles of said solid matter composing the fluid mass, they will not float in the fluid mass but will.be expelled therefrom by the upwardly rising liquid by which the fluidity of the fluid mass is maintained and will pass off with the supernatant liquid or will form a separate fluid mass consisting of said lighter particles overlying the fluid mass intended to be used as the separating medium, the operation of the apparatus upon such particles, therefore, not being one of separation by flotation but merely separation by the classifying action of a rising current of liquid. It will of course, be understood, inasmuch as my present method is based on the principle of differential flotation, that accurate sizing of the materials to be separated is not necessary as the principle of separation of the materials by differences in their relative falling velocities is not employed.

In order that the particles of comminuted solids may be readily removed from the separated materials I preferably employ a comminuted solid of such size that it will not act as a suspension in the liquid but will require continuous agaitation with a liquid to attain and maintain the properties of a fluid mass, it being immaterial to the operation of my invention whether all of this agitation is produced within the separating tank or whether agitation is assisted by that produced by returning to the apparatus the fluid mass removed thereform. I do not however limit myself to the application of my method to fluid masses composed entirely of comminuted solids which are not suspensions, for in certain cases my fluid mass may contain a considerable quantity of comminuted solid matter consisting of particles of extremely fine size, so that this portion of the fluid mass may have properties similar to those of a suspension and assist in maintaining that portion of the comminuted solid material consisting of particles of larger size, in the fluidic condition necessary to the formation and maintenance of a fluid mass of the desired character.

While in the several drawings the mechanical agitator is shown to be of the slow speed baffle or paddle type it will be understood that high speed agitators of the propeller type, jigging plungers, or the like, may be used for this purpose. In certain cases it may be desirable to supply nearly all of the agitating effect through the medium of such mechanical agitators. In some cases it may be desirable to extend the mechanical agitation to the extensions 3 and 3ª containing the fluid media of low density.

It will of course be understood that for the final desanding of the separated materials screens of any type may be employed, or that the comminuted solid component of the fluid mass admixed with the separated materials may be removed by hydraulic classifiers of types commonly in use and adapted to act upon said separated materials after their removal from the apparatus employed for separation.

While I employ an upwardly rising current of the fluid medium in 3 which assists in supporting the fluid mass used as the separating agent, it will be understood that this current is of extremely low velocity and is only sufficient either, (1) to prevent the finely comminuted solid constituent of the fluid mass from descending with the separated material of high specific gravity (in that embodiment of the invention in which the fluid medium is composed of liquid), or (2) to produce a fluid medium of low specific gravity composed of an agitated mixture of comminuted solid matter and liquid, the low density of which is attained and maintained by said upward rising current. Said current therefore is not employed to produce a concentrating or classifying effect on the separated materials falling through it and it should therefore not have a velocity of flow sufficient to produce a material change in the relative falling velocities of said materials. It will be clear that the apparatus may be so proportioned that such upward rising current will be of sufficient velocity to prevent the fall of comminuted solids small enough to employ in the fluid mass while allowing the free fall and removal from the apparatus of larger or heavier particles introduced into said mass with the feed. The fluid medium then becomes in effect a classifier for selectively retaining comminuted solids that may be introduced with the feed, such solids acting as makeup material to provide for the loss of portions of the fluid mass admixed with the discharged separated materials.

It will be understood that various adjunctive devices, such as classifiers or screens for maintaining the proper size of the comminuted solid component of the fluid mass, dewatering devices, chip-removers, etc., of assistance in the operation of my invention, may be applied by any skilled in the art.

In the several drawings the arrows indicate the direction of movement of the materials being separated into, through and out of the apparatus.

In this specification and the claims hereof the term "fluid mass" is used to denote an agitated mixture of comminuted solid matter and liquid, said comminuted solid preferably being composed of grains of greater specific gravity than that of the material to be floated and of such size that the fluid mass resulting from agitation of said mixture will produce a flotational effect on said material, said agitation being a necessary element to the production of such fluid mass.

The term "fluid medium" in the specification and claims hereof is used to denote a fluid body assisting to support a fluid mass of the defined type and of less density than said fluid mass. Said fluid medium may consist of an agitated mixture of liquid and comminuted solid matter, the dilution of said solid in said liquid being greater than that employed in the supernatant fluid mass and the density thereof therefore less. If hydraulic liquid is introduced into a receptacle below, and in free communication with, the fluid mass for the agitation thereof and the upward current of said liquid in said receptacle is uniformly greater than the falling velocity of the comminuted solid component of said fluid mass, then none of said solid that may fall into said receptacle will remain therein and the hydraulic liquid will therefore provide a fluid medium composed of liquid alone. Said fluid medium, whether composed of an agitated mixture of comminuted solids and liquid or of liquid alone, thus affords a means for removing from said fluid mass the separated material of high specific gravity that has fallen through said fluid mass, with a minimum of the comminuted solid component of said mass admixed therewith.

Having described my invention I claim:

1. A method for separating materials of different specific gravities which consists in immersing said materials in a fluid mass consisting of an agitated mixture of liquid and comminuted solids heavier than said liquid and substantially insoluble therein, the specific gravity of said fluid mass being greater than that of the lighter and less than that of the heavier of said materials, in causing the heavier of said materials to sink through said fluid mass into and through an upwardly rising body of liquid subjacent to said fluid mass and in unobstructed communication therewith.

2. The method of claim 1, and, in trapping the said heavier materials out of said upwardly rising liquid through a liquid seal, whereby the entrance of air into said upwardly rising body of liquid and into said fluid mass during said trapping operation is prevented.

3. Apparatus for separating materials of different specific gravities, comprising in combination a receptacle, a fluid mass consisting of an agitated mixture of liquid and comminuted solids heavier than said liquid and substantially insoluble therein in said receptacle, the specific gravity of said fluid mass being greater than that of the lighter and less than that of the heavier of said materials, a conduit connected to the base of said receptacle, means for passing an upwardly rising current of liquid through said conduit and said fluid mass, means operatively connected to the lower portion of said conduit for removing the heavier of said materials and means in operative relation to the upper part of said receptacle for the removal of the lighter of said materials to be separated, in which the means for removal of the heavier of the separated materials include a liquid seal through which said materials are removed, whereby the admission of air to said conduit and said receptacle is prevented.

4. Apparatus for separating materials of different specific gravities, comprising in combination a receptacle, a fluid mass consisting of an agitated mixture of liquid and comminuted solids heavier than said liquid and substantially insoluble therein in said receptacle, the specific gravity of said fluid mass being greater than that of the lighter and less than that of the heavier of said materials, a conduit connected to the base of said receptacle, means for passing an upwardly rising current of liquid through said fluid mass, means operatively connected to the lower portion of said conduit for removing the heavier of said materials and means in operative relation to the upper part of said receptacle for the removal of the lighter of said materials to be separated, the means for the removal of the heavier material comprising an inlet and discharge valve to a chamber located between said valves, said chamber being provided with a vent for the discharge of air from said chamber extending above the level of the mass.

5. Apparatus for separating materials of different specific gravities, comprising in combination a receptacle, a fluid mass consisting of an agitated mixture of liquid and comminuted solids heavier than said liquid and substantially insoluble therein in said receptacle, the specific gravity of said fluid mass being greater than that of the lighter and less than that of the heavier of said materials, a conduit connected to the base of said receptacle, means for passing a classifying current therethrough, means for passing an upwardly rising current of liquid including the current from the conduit through said fluid mass, means operatively connected to the lower portion of said conduit for removing the heavier of said materials, and means in operative relation to the upper part of said receptacle for the removal of the lighter of said materials to be separated.

6. Apparatus for separating materials of different specific gravities comprising in combination a receptacle containing an agitated fluid mass and constituting a "float and sink" apparatus for the separation of materials by flotation of the lighter and sinking of the heavier of said materials, an upward current classifier upon which said float and sink apparatus is superposed and is in direct operative relation and communication with said float and sink apparatus, whereby the heavier materials separated by sinking in said fluid mass are then subjected to the classifying action of said upward current classifier, the liquid producing said upward current being further used to assist in maintaining the agitation of said fluid mass, and means for removing the heavier and larger classified materials from said classifier.

In testimony whereof I have hereunto set my hand at Philadelphia, Pennsylvania, this 21st day of January, 1921.

THOMAS M. CHANCE.

sisting of an agitated mixture of liquid and comminuted solids heavier than said liquid and substantially insoluble therein in said receptacle, the specific gravity of said fluid mass being greater than that of the lighter and less than that of the heavier of said materials, a conduit connected to the base of said receptacle, means for passing an upwardly rising current of liquid through said fluid mass, means operatively connected to the lower portion of said conduit for removing the heavier of said materials and means in operative relation to the upper part of said receptacle for the removal of the lighter of said materials to be separated, the means for the removal of the heavier material comprising an inlet and discharge valve to a chamber located between said valves, said chamber being provided with a vent for the discharge of air from said chamber extending above the level of the mass.

5. Apparatus for separating materials of different specific gravities, comprising in combination a receptacle, a fluid mass consisting of an agitated mixture of liquid and comminuted solids heavier than said liquid and substantially insoluble therein in said receptacle, the specific gravity of said fluid mass being greater than that of the lighter and less than that of the heavier of said materials, a conduit connected to the base of said receptacle, means for passing a classifying current therethrough, means for passing an upwardly rising current of liquid including the current from the conduit through said fluid mass, means operatively connected to the lower portion of said conduit for removing the heavier of said materials, and means in operative relation to the upper part of said receptacle for the removal of the lighter of said materials to be separated.

6. Apparatus for separating materials of different specific gravities comprising in combination a receptacle containing an agitated fluid mass and constituting a "float and sink" apparatus for the separation of materials by flotation of the lighter and sinking of the heavier of said materials, an upward current classifier upon which said float and sink apparatus is superposed and is in direct operative relation and communication with said float and sink apparatus, whereby the heavier materials separated by sinking in said fluid mass are then subjected to the classifying action of said upward current classifier, the liquid producing said upward current being further used to assist in maintaining the agitation of said fluid mass, and means for removing the heavier and larger classified materials from said classifier.

In testimony whereof I have hereunto set my hand at Philadelphia, Pennsylvania, this 21st day of January, 1921.

THOMAS M. CHANCE.

DISCLAIMER 1,559,937.—*Thomas M. Chance*, Philadelphia, Pa. METHOD AND APPARATUS FOR SEPARATING MATERIALS OF DIFFERENT SPECIFIC GRAVITIES. Patent dated November 3, 1925. Disclaimer filed March 25, 1940, by *Provident Trust Company* and *Marcus A. Walker*, trustees under the will of Thomas M. Chance, deceased.

Hereby disclaim claims 1 to 4 inclusive.

[*Official Gazette April 16, 1940.*]

DISCLAIMER 1,559,937.—*Thomas M. Chance*, Philadelphia, Pa. METHOD AND APPARATUS FOR SEPARATING MATERIALS OF DIFFERENT SPECIFIC GRAVITIES. Patent dated November 3, 1925. Disclaimer filed March 25, 1940, by *Provident Trust Company* and *Marcus A. Walker*, trustees under the will of Thomas M. Chance, deceased.

Hereby disclaim claims 1 to 4 inclusive.
[*Official Gazette April 16, 1940.*]